(12) United States Patent
Deng et al.

(10) Patent No.: US 11,329,549 B2
(45) Date of Patent: May 10, 2022

(54) HYBRID MODULAR MULTILEVEL CONVERTER HAVING FAULT BLOCKING CAPABILITY, AND CONTROL METHOD THEREOF

(71) Applicant: SOUTHEAST UNIVERSITY, Nanjing (CN)

(72) Inventors: FuJin Deng, Nanjing (CN); ChengKai Liu, Nanjing (CN)

(73) Assignee: SOUTHEAST UNIVERSITY, Nanjing (CN)

( * ) Notice: Subject to any disclaimer, the term of this patent is extended or adjusted under 35 U.S.C. 154(b) by 0 days.

(21) Appl. No.: 17/274,485

(22) PCT Filed: Sep. 28, 2020

(86) PCT No.: PCT/CN2020/118553
§ 371 (c)(1),
(2) Date: Mar. 9, 2021

(87) PCT Pub. No.: WO2021/135459
PCT Pub. Date: Jul. 8, 2021

(65) Prior Publication Data
US 2022/0094260 A1 Mar. 24, 2022

(30) Foreign Application Priority Data
Jan. 3, 2020 (CN) .......................... 202010004307.4

(51) Int. Cl.
*H02M 7/5387* (2007.01)
*H02M 1/32* (2007.01)
(Continued)

(52) U.S. Cl.
CPC ............ *H02M 1/32* (2013.01); *H02H 7/1227* (2013.01); *H02M 1/0095* (2021.05); *H02M 7/53871* (2013.01)

(58) Field of Classification Search
CPC ............ H02H 7/1227; H02M 7/53871; H02M 7/5387; H02M 7/5388; H02M 7/515; H02M 7/483; H02M 1/32; H02M 1/0095
See application file for complete search history.

(56) References Cited

U.S. PATENT DOCUMENTS

2012/0112545 A1* 5/2012 Aiello ................. H02M 7/4837
307/64
2015/0372612 A1* 12/2015 Nami .................... H02M 7/162
363/123
(Continued)

FOREIGN PATENT DOCUMENTS

| CN | 102931863 A | 2/2013 |
| CN | 104917415 A | 9/2015 |

(Continued)

*Primary Examiner* — Nguyen Tran
(74) *Attorney, Agent, or Firm* — Bayramoglu Law Offices LLC

(57) ABSTRACT

A hybrid modular multilevel converter having fault blocking capability, and a control method thereof are disclosed. The hybrid modular multilevel converter has an ABC three-phase structure, each phase includes an identical upper arm and lower arm, and the upper arm and the lower arm are each composed of N submodules, including M unipolar full bridge submodules and N-M half bridge submodules, which are connected in series; two identical arm inductors are connected in series between a lower end of the upper arm and an upper end of the lower arm in a same phase; and upper arms and lower arms of three phases are connected in a staggered manner through six thyristor branches, the upper ends of the upper arms of the three phases are short-circuited and are connected to a DC side via a first isolating switch.

10 Claims, 2 Drawing Sheets

(51) Int. Cl.
    *H02H 7/122*     (2006.01)
    *H02M 1/00*     (2006.01)

(56) References Cited

U.S. PATENT DOCUMENTS

2018/0034358 A1     2/2018   Geske
2018/0034382 A1*   2/2018   Chivite Zabalza ... H02M 7/483

FOREIGN PATENT DOCUMENTS

| CN | 105490285 A | 4/2016 |
| CN | 105914772 A | 8/2016 |
| CN | 111049407 A | 4/2020 |

* cited by examiner

HYBRID MODULAR MULTILEVEL CONVERTER HAVING FAULT BLOCKING CAPABILITY, AND CONTROL METHOD THEREOF

CROSS REFERENCE TO THE RELATED APPLICATIONS

This application is the national stage entry of International Application No. PCT/CN2020/118553, filed on Sep. 28, 2020, which is based upon and claims priority to Chinese Patent Application No. 202010004307.4, filed on Jan. 3, 2020, the entire contents of which are incorporated herein by reference.

TECHNICAL FIELD

The present invention belongs to the technical field of multilevel power electronic converters, and particularly relates to a hybrid modular multilevel converter based on interleaved thyristor branches and having fault blocking capability, and a control method thereof.

BACKGROUND

Compared with traditional two-level and three-level converters, a modular multilevel converter (MMC) has the characteristics of high efficiency, low output AC voltage harmonics, high modularity and the like, has demonstrated important engineering application prospects in high-voltage and high-power systems, and is gradually popularized and applied to renewable energy grid connection, high-voltage DC transmission, DC grid and other fields.

Due to the existence of free-wheeling diodes in the traditional half bridge MMC, in the case of a short-circuit fault, the free-wheeling diodes will form an uncontrolled rectification circuit, after the converter is blocked, short-circuit current is continuously fed into a short-circuit point through the diode rectification circuit from the AC side. Since the short-circuit current cannot be extinguished at zero crossing, it is impossible to clear a DC side short-circuit fault by simply blocking the half bridge MMC. When the short-circuit fault occurs, huge short-circuit current is generated, which brings harm to the converter, the transmission line and the electric load, and in severe cases, a power electronic device of the converter may fail and cannot be put into operation.

In order to clear the short-circuit fault, the MMC needs to be equipped with at least half of full bridge submodules to clear the short-circuit fault. However, the number of switching devices of the full bridge submodules is twice that of the switching devices of traditional half bridge submodules, so the loss and device cost of the full bridge submodules are close to twice those of the half bridge submodules, and a large number of full bridge submodules increase the loss during normal operation of the converter, and also increase the construction cost of the converter.

In response to the above problems, the present solution is generated.

SUMMARY

The purpose of the present invention is to provide a hybrid modular multilevel converter having fault blocking capability, and a control method thereof. The hybrid modular multilevel converter can achieve the same output characteristics as the traditional three-phase modular multilevel converter, and meanwhile, when a DC side short-circuit fault occurs, the hybrid modular multilevel converter quickly extinguishes the short-circuit current to realize short-circuit fault protection.

In order to achieve the above purpose, the solution of the present invention is:

A hybrid modular multilevel converter having fault blocking capability, wherein the multilevel converter has an ABC three-phase structure, each phase includes the same upper arm and lower arm, the upper arm and the lower arm are each composed of N submodules, including M unipolar full bridge submodules and N-M half bridge submodules, which are connected in series, and the value of M is determined by the calculation of short-circuit parameters; two identical arm inductors are connected in series between the lower end of the upper arm and the upper end of the lower arm in the same phase;

a first thyristor branch is connected between the lower end of the upper arm of the phase A and the upper end of the lower arm of the phase B, and the cathode of the first thyristor branch is connected to the lower arm of the phase B; a second thyristor branch is connected between the upper end of the lower arm of the phase B and the lower end of the upper arm of the phase C, and the cathode of the second thyristor branch is connected to the upper arm of the phase C; a third thyristor branch is connected between the lower end of the upper arm of the phase C and the upper end of the lower arm of the phase A, and the cathode of the third thyristor branch is connected to the lower arm of the phase A; a fourth thyristor branch is connected between the upper end of the lower arm of the phase A and the lower end of the upper arm of the phase C, and the cathode of the fourth thyristor branch is connected to the upper arm of the phase B; a fifth thyristor branch is connected between the lower end of the upper arm of the phase B and the upper end of the lower arm of the phase C, and the cathode of the fifth thyristor branch is connected to the lower arm of the phase C; a sixth thyristor branch is connected between the upper end of the lower arm of the phase C and the lower end of the upper arm of the phase A, and the cathode of the sixth thyristor branch is connected to the upper arm of the phase A; and the upper ends of the upper arms of the three phases are short-circuited and are connected to a DC side via a first isolating switch, and the lower ends of the lower arms of the three phases are short-circuited and are connected to the DC side via a second isolating switch.

The above-mentioned unipolar full bridge submodule includes first to third IGBTs ($T_{u1}$-$T_{u3}$), a first diode, and a first electrolytic capacitor, wherein the emitter of the first IGBT is connected to the collector of the second IGBT, and the connection point is used as a positive terminal of the unipolar full bridge submodule; the collector of the first IGBT is connected to the cathode of the first diode and the anode of the first electrolytic capacitor respectively, the anode of the first diode is connected to the collector of the third IGBT, and the connection point is used as a negative terminal of the unipolar full bridge submodule; and the emitter of the third IGBT, the cathode of the first electrolytic capacitor and the emitter of the second IGBT are connected with each other.

The first to third IGBTs are all connected with anti-paralleled diodes.

The above-mentioned half bridge submodule includes a fourth IGBT ($T_{h1}$), a fifth IGBT ($T_{h2}$) and a second electrolytic capacitor, wherein the anode and the cathode of the second electrolytic capacitor are respectively connected to the collector of the fourth IGBT and the emitter of the fifth IGBT, the emitter of the fourth IGBT is connected to the collector of the fifth IGBT, the connection point is used as the positive terminal of the half bridge submodule, and the emitter of the fifth IGBT is used as the negative terminal of the half bridge submodule.

The above-mentioned fourth to fifth IGBTs are all connected with anti-paralleled diodes.

The method of determining the value of M by the calculation of short-circuit parameters includes: firstly, calculating the inductance $L_d$ of a transmission line and the resistance $R_d$ of the transmission line according to the maximum length $L_m$ of the transmission line; then, according to a given DC short-circuit fault blocking time $T_{int}$, fault protection action current $I_{act}$, $L_d$ and $R_d$, calculating a negative voltage $V_{neg}$ that needs to be injected during the fault blocking process; and finally, calculating the number M of required UFB-SM according to $V_{neg}$ and the rated capacitor voltage $U_{cN}$ of the UFB-SM.

The above-mentioned first to sixth thyristor branches are all formed by connecting $N_{TB}$ thyristors in series, and the calculation method of $N_{TB}$ includes: firstly, determining the voltage $U_T$ that each thyristor can withstand according to the model selection of the thyristor; and then, according to the rated operation voltage $V_{dcn}$ on the DC side, calculating the number $N_{TB}$ of series-connected thyristors of each thyristor branch through $N_{TB}=V_{dcn}/U_T$.

The control method of the hybrid modular multilevel converter having fault blocking capability as mentioned above is used for performing the following control during normal operation:

during normal operation, the fourth IGBT and the fifth IGBT in the half bridge submodule operate complementarily, the first IGBT and the second IGBT in the unipolar full bridge submodule operate complementarily, the third IGBT remains on, the thyristor branch remains off, and the first and second isolating switches remain closed.

According to the control method of the hybrid modular multilevel converter having fault blocking capability as mentioned above, the DC side short-circuit fault clearing control method is as follows:

sampling the DC side current $i_{dc}$, when $i_{dc}$ is greater than 1.5 times of a rated value, judging that a short-circuit fault occurs on the DC side, at this time, entering a short-circuit fault clearing phase, turning off all of the first to third IGBTs in the unipolar full bridge submodule, turning off both of the fourth and fifth IGBTs in the half bridge submodule, and turning on the thyristors in all thyristor branches.

According to the control method of the hybrid modular multilevel converter having fault blocking capability as mentioned above, the short-circuit fault clearing control method on the AC side is as follows:

sampling the DC side current $i_{dc}$, when $i_{dc}$ drops to zero, judging that the short-circuit fault is cleared, and sending a disconnection command to the first and second isolating switches on the DC side; after the first and second isolating switches are disconnected, entering an AC side short-circuit fault clearing phase; and turning on the third IGBT in the unipolar full bridge submodule, and removing a driving signal of the thyristor.

After the above solution is adopted, the present invention can actively create a three-phase short circuit on the AC side when detecting the DC side short-circuit fault, so that the AC side will not inject short-circuit current into the DC side; and in addition, a negative electromotive force can also be injected on the DC side to quickly extinguish the current on the DC side. The solution has the advantages of quickly clearing the DC side short-circuit fault, and having low operation loss and low infrastructure construction cost and the like. It has demonstrated important engineering application prospects in high-voltage and high-power systems, and is gradually popularized and applied to renewable energy grid connection, high-voltage DC transmission, DC grid and other fields.

Compared with the prior art, the present invention has the following advantages:

(1) The present invention can extinguish the short-circuit current on the DC side within 3 milliseconds and clear the short-circuit fault;

In the traditional three-phase half bridge modular multilevel converter, when the DC side short-circuit fault occurs, the free-wheeling diodes constitutes the uncontrolled rectification circuit, so the short-circuit current cannot be extinguished by the blocking converter; the present invention adopts interleaved thyristors and the mixed design of half bridge submodules and unipolar full bridge submodules to quickly extinguish the short-circuit current through appropriate short-circuit fault clearing control methods; and due to the existence of the interleaved thyristors, the thyristors are triggered at the time of DC short-circuit fault detected, so as to create a three-phase short circuit on the AC side and bypass the arm inductors from the DC current circuit, so that the AC side cannot inject the short-circuit current into the DC side. In addition, the present invention uses the blocked unipolar full bridge submodules to inject the negative electromotive force into the DC side to absorb the energy stored in the transmission line, so that the short-circuit current quickly drops to zero, and the DC side short-circuit fault is quickly cleared, this is the essential difference of the present invention with the existing modular multilevel converter topology.

(2) The present invention has smaller converter loss during normal operation;

The traditional modular multilevel converter needs to be equipped with at least half of full bridge submodules in order to clear the DC side short-circuit fault; the hybrid modular multilevel converter based on interleaved thyristors and having fault blocking capability proposed in the present invention only needs about 14% of unipolar full bridge submodules, thereby reducing the number of full bridge submodules by 72% compared with the traditional modular multilevel converter; and in the case of normal operation, the converter proposed by the present invention reduces the converter loss by 17% compared with the traditional modular multilevel converter, and the converter reduces the electric energy loss while meeting safe and reliable operation.

(3) The infrastructure construction cost of the present invention is low;

The traditional modular multilevel converter needs to be equipped with at least half of full bridge submodules in order to clear the DC side short-circuit fault; the hybrid modular multilevel converter based on interleaved thyristors and having fault blocking capability proposed in the present invention only needs about 14% of unipolar full bridge submodules, but adds 6 thyristor branches; since the prices of thyristors and diodes are much lower than those of insulated gate bipolar transistors (IGBT) under the same voltage and current level, the infrastructure construction cost of this solution is 16% lower than that of the traditional modular multilevel converter, so the present invention has a greater advantage on the initial infrastructure construction cost of the converter.

REFERENCE SIGNS 2.1 represents the state of a novel MMC during normal operation, 2.2 represents the state of the novel MMC in a DC side short-circuit fault clearing phase, and 2.3 represents the state of the novel MMC in an AC side short-circuit fault clearing phase.

DETAILED DESCRIPTION OF THE EMBODIMENTS

The technical solutions and the beneficial effects of the present invention will be described in detail below in conjunction with the drawings.

Figure 1:
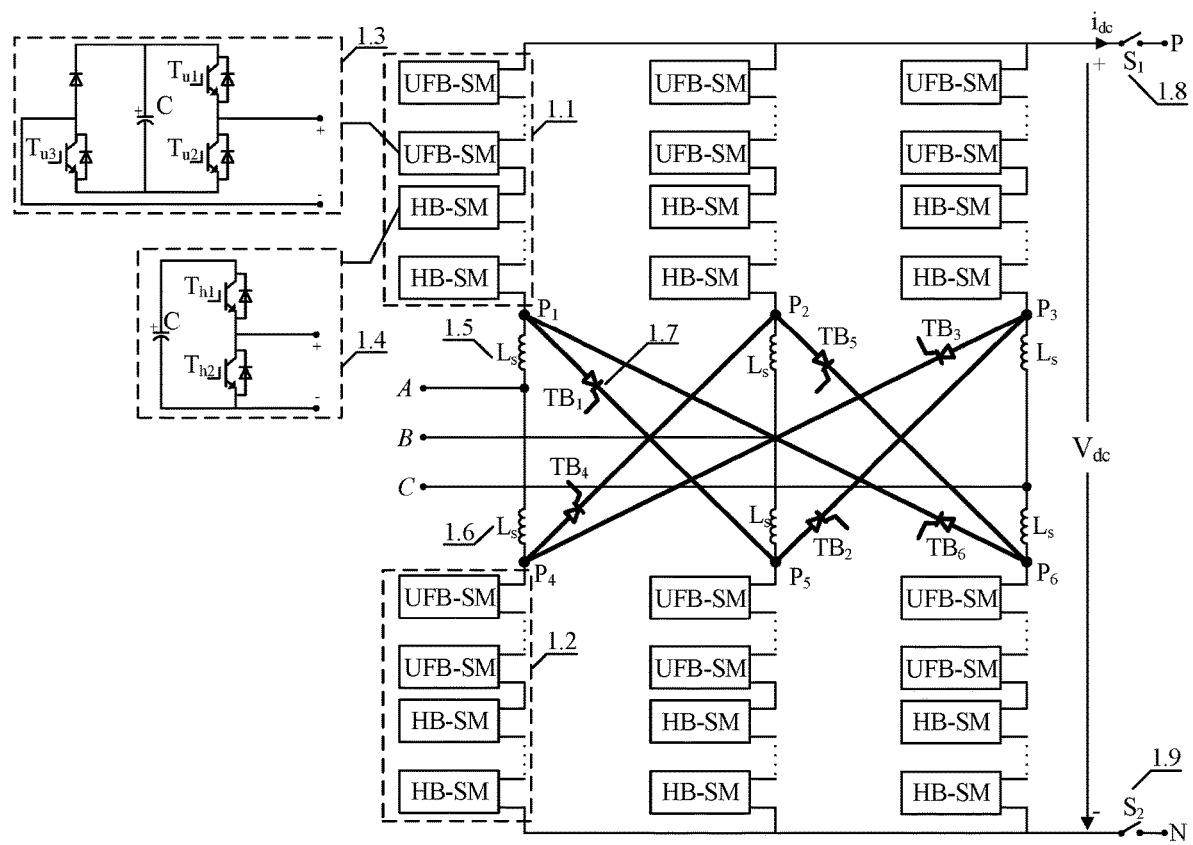
FIG. 1 is a circuit diagram of an MMC of the present invention.

As shown in FIG. 1, the present invention provides a hybrid modular multilevel converter based on interleaved thyristor branches and having fault blocking capability. Each phase of the multilevel converter includes two identical upper and lower arms 1.1 and 1.2, each arm is composed of N submodules (submodule, SM), including M unipolar full bridge submodules (UFB-SM) 1.3 and (N-M) half bridge submodules (HB-SM) 1.4, and the value of M is determined by the calculation of short-circuit parameters; the upper arm and the lower arm are connected in each phase through two identical arm inductors 1.5 and 1.6; the arms of different phases are connected in a staggered manner through 6 thyristor branches (thyristor branch, TB) 1.7, each thyristor branch is formed by connecting NTB thyristors in series, wherein $TB_1$ is connected to $P_1$ and $P_5$, and the cathode thereof points to $P_5$, $TB_2$ is connected to $P_5$ and $P_3$, and the cathode thereof points to $P_3$, $TB_3$ is connected to $P_3$ and $P_4$, and the cathode thereof points to $P_4$, $TB_4$ is connected to $P_4$ and $P_2$, and the cathode thereof points to $P_2$, $TB_5$ is connected to $P_2$ and $P_6$, and the cathode thereof points to $P_6$, $TB_6$ is connected to $P_6$ and $P_1$, and the cathode thereof points to $P_1$, and the upper (lower) ends of the upper (lower) arms are connected to the DC side through isolating switches 1.8 and 1.9.

The number M of UFB-SM is determined by the calculation of short-circuit parameters: firstly, calculating the inductance $L_d$ of a transmission line and the resistance $R_d$ of the transmission line according to the maximum length $L_m$ of the transmission line; then, according to a given DC short-circuit fault blocking time $T_{int}$, fault protection action current $I_{act}$, $L_d$ and $R_d$, calculating a negative voltage $V_{neg}$ that needs to be injected during the fault blocking process; and $$v_{neg} = R_d \times I_{act} \times \frac{e^{-\frac{R_d}{L_d}T_{int}}}{1 - e^{-\frac{R_d}{L_d}T_{int}}}$$

finally, calculating the number M of required UFB-SM according to $V_{neg}$ and the rated capacitor voltage $U_{cN}$ of the UFB-SM:

$$M = V_{neg}/(2U_{cN})$$

The number $N_{TB}$ of series-connected thyristors of the thyristor branch is determined by the model selection of the thyristor and the DC voltage: firstly, determining the voltage $U_T$ that each thyristor can withstand according to the model selection of the thyristor; and then, according to the rated operation voltage $V_{dcn}$ on the DC side, calculating the number $N_{TB}$ of series-connected thyristors of each thyristor branch through $N_{TB} = V_{dcn}/U_T$.

Figure 2:
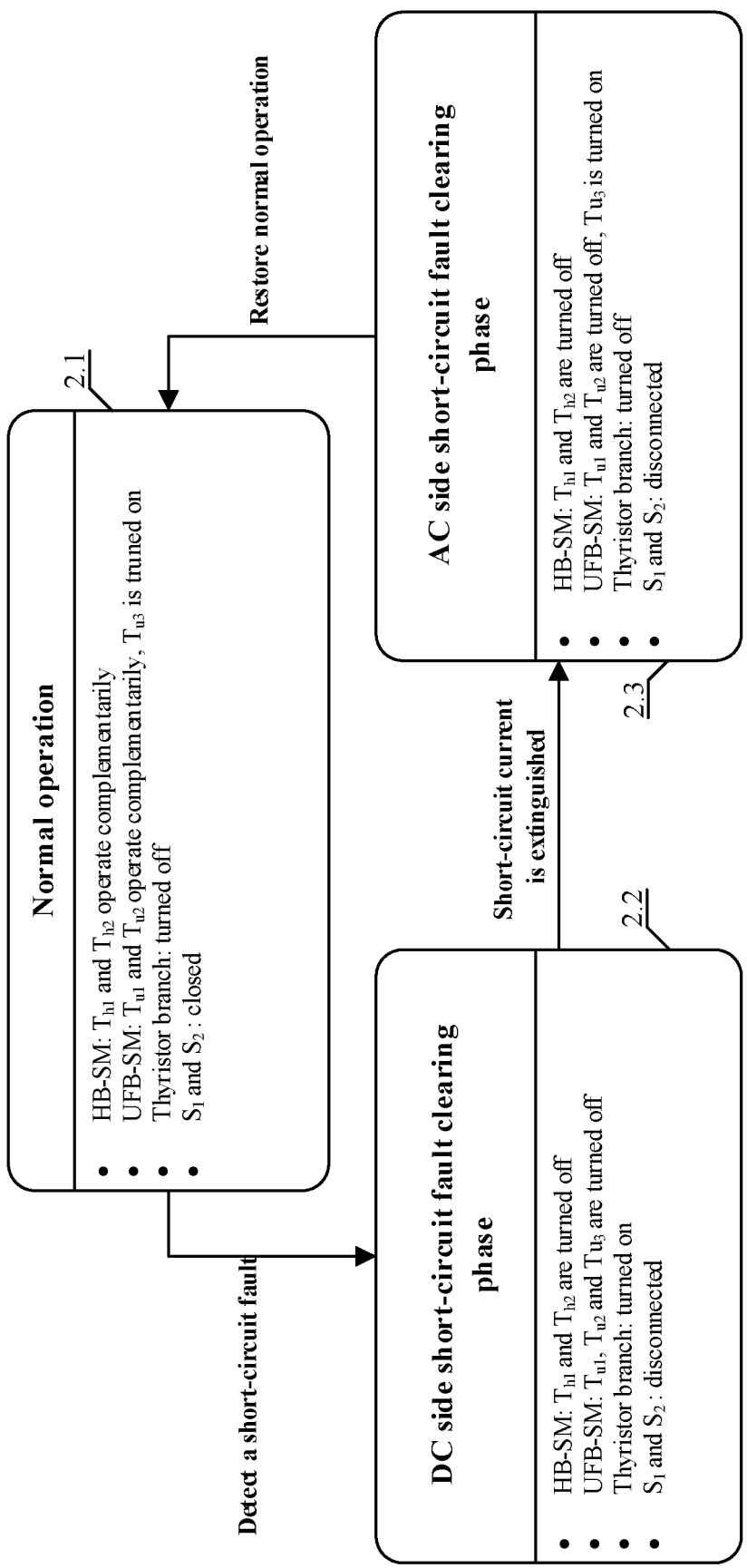
FIG. 2 is a control block diagram of an MMC of the present invention.

As shown in FIG. 2, the control method of the hybrid modular multilevel converter based on interleaved thyristor branches and having fault blocking capability includes control during normal operation, DC side short-circuit fault clearing control and AC side short-circuit fault clearing control, and the steps are as follows:

1) during normal operation, $T_{h1}$ and $T_{h2}$ of the HB-SM operate complementarily, $T_{u1}$ and $T_{u2}$ of the HB-SM operate complementarily, $T_{u3}$ remains on, the thyristor branch remains off, and the isolating switches $S_1$ and $S_2$ remain closed.

2) The DC side current $i_{dc}$ is sampled and is used as the criterion of detecting a DC side short-circuit fault. When the DC side short-circuit fault is detected, a short-circuit fault clearing phase is performed, all of $T_{u1}$, $T_{u2}$ and $T_{u3}$ in the UFB-SM are turned off, both of $T_{h1}$ and $T_{h1}$ in the UFB-SM are turned off, and the thyristors in all thyristor branches are turned on.

3) When DC side current drops to zero, it is used as the criterion of clearing the short-circuit fault. When it is detected the DC side short-circuit fault has been cleared, a disconnection command is sent to the isolating switches $S_1$ and $S_2$ on the DC side; after the isolating switches are disconnected, the AC side short-circuit fault clearing phase is performed; and $T_{u3}$ in the UFB-SM is turned on, and a driving signal of the thyristor is removed.

The above control strategy ensures that the hybrid modular multilevel converter based on interleaved thyristor branches and having fault blocking capability can effectively extinguish the short-circuit current and clear the short-circuit fault.

The above embodiments are only used for illustrating the technical ideas of the present invention, but cannot be used for limiting the protection scope of the present invention. Any changes, made on the basis of the technical solutions according to the technical ideas proposed by the present invention, fall into the protection scope of the present invention.

What is claimed is:

1. A hybrid modular multilevel converter having a fault blocking capability, wherein:
   the hybrid modular multilevel converter has an ABC three-phase structure, each phase comprises an upper arm and a lower arm, the upper arm and the lower arm are identical and each composed of N submodules, comprising M unipolar full bridge submodules and N-M half bridge submodules, which are connected in series, and a value of M is determined by a calculation of short-circuit parameters;
   two identical arm inductors are connected in series between a lower end of the upper arm and an upper end of the lower arm in a same phase;
   a first thyristor branch is connected between the lower end of the upper arm of a phase A and the upper end of the lower arm of a phase B, and a cathode of the first thyristor branch is connected to the lower arm of the phase B;
   a second thyristor branch is connected between the upper end of the lower arm of the phase B and the lower end of the upper arm of a phase C, and a cathode of the second thyristor branch is connected to the upper arm of the phase C;
   a third thyristor branch is connected between the lower end of the upper arm of the phase C and the upper end of the lower arm of the phase A, and a cathode of the third thyristor branch is connected to the lower arm of the phase A;

a fourth thyristor branch is connected between the upper end of the lower arm of the phase A and the lower end of the upper arm of the phase C, and a cathode of the fourth thyristor branch is connected to the upper arm of the phase B;

a fifth thyristor branch is connected between the lower end of the upper arm of the phase B and the upper end of the lower arm of the phase C, and a cathode of the fifth thyristor branch is connected to the lower arm of the phase C;

a sixth thyristor branch is connected between the upper end of the lower arm of the phase C and the lower end of the upper arm of the phase A, and a cathode of the sixth thyristor branch is connected to the upper arm of the phase A; and upper ends of upper arms of three phases are short-circuited and are connected to a DC side via a first isolating switch, and lower ends of lower arms of the three phases are short-circuited and are connected to the DC side via a second isolating switch.

2. The hybrid modular multilevel converter having the fault blocking capability-according to claim 1, wherein the unipolar full bridge submodule comprises a first IGBT a second IGBT, a third IGBT, a first diode, and a first electrolytic capacitor, wherein an emitter of the first IGBT is connected to a collector of the second IGBT, and a connection point is used as a positive terminal of the unipolar full bridge submodule;

a collector of the first IGBT is connected to a cathode of the first diode and an anode of the first electrolytic capacitor respectively, an anode of the first diode is connected to a collector of the third IGBT, and the connection point is used as a negative terminal of the unipolar full bridge submodule; and an emitter of the third IGBT, a cathode of the first electrolytic capacitor and an emitter of the second IGBT are connected to each other.

3. The hybrid modular multilevel converter having the fault blocking capability according to claim 2, wherein the first IGBT, the second IGBT and the third IGBT are connected to anti-paralleled diodes.

4. The hybrid modular multilevel converter having the fault blocking capability-according to claim 2, wherein the half bridge submodule comprises a fourth IGBT, a fifth IGBT and a second electrolytic capacitor, wherein an anode and a cathode of the second electrolytic capacitor are respectively connected to a collector of the fourth IGBT and an emitter of the fifth IGBT, an emitter of the fourth IGBT is connected to a collector of the fifth IGBT, the connection point is used as the positive terminal of the half bridge submodule, and the emitter of the fifth IGBT is used as the negative terminal of the half bridge submodule.

5. The hybrid modular multilevel converter having the fault blocking capability according to claim 4, wherein the fourth IGBT and the fifth IGBT are connected to anti-paralleled diodes.

6. The hybrid modular multilevel converter having the fault blocking capability according to claim 1, wherein a method of determining the value of M by the calculation of the short-circuit parameters comprises:

first, calculating an inductance $L_d$ of a transmission line and a resistance $R_d$ of the transmission line according to a maximum length $L_m$ of the transmission line;

then, according to a given DC short-circuit fault blocking time $T_{int}$, a fault protection action current $I_{act}$, $L_d$ and $R_d$, calculating a negative voltage $V_{neg}$ that needs to be injected during a fault blocking process; and finally, calculating a number M of required UFB-SM according to $V_{neg}$ and a rated capacitor voltage $U_{cN}$ of the UFB-SM.

7. The hybrid modular multilevel converter having the fault blocking capability according to claim 1, wherein the first thyristor branch, the second thyristor branch, the third thyristor branch, the fourth thyristor branch, the fifth thyristor branch and the sixth thyristor branch are formed by connecting $N_{TB}$ thyristors in series, and a calculation method of $N_{TB}$ comprises:

first, determining a voltage $U_T$ that each thyristor can withstand according to a model selection of the each thyristor; and then, according to a rated operation voltage $V_{dcn}$ on the DC side, calculating a number $N_{TB}$ of series-connected thyristors of each thyristor branch through $N_{TB} = V_{dcn}/U_T$.

8. A control method of the hybrid modular multilevel converter having the fault blocking capability according to claim 4, wherein the following control is performed during a normal operation:

during normal operation, the fourth IGBT and the fifth IGBT in the half bridge submodule operate complementarily, the first IGBT and the second IGBT in the unipolar full bridge submodule operate complementarily, the third IGBT remains on, a thyristor branch remains off, and the first isolating switch and the second isolating switch remain closed.

9. The control method of the hybrid modular multilevel converter having the fault blocking capability according to claim 4, wherein a DC side short-circuit fault clearing control method is as follows:

sampling a DC side current $i_{dc}$, when $i_{dc}$ is greater than 1.5 times of a rated value, judging that a short-circuit fault occurs on the DC side, at this time, entering a short-circuit fault clearing phase, turning off the first IGBT, the second IGBT and the third IGBT in the unipolar full bridge submodule, turning off both of the fourth IGBT and the fifth IGBT in the half bridge submodule, and turning on thyristors in all thyristor branches.

10. The control method of the hybrid modular multilevel converter having the fault blocking capability according to claim 4, wherein a short-circuit fault clearing control method on an AC side is as follows:

sampling a DC side current idc, when $i_{dc}$ drops to zero, judging that a short-circuit fault is cleared, and sending a disconnection command to the first isolating switch and the second isolating switch on the DC side;

after the first isolating switch and the second isolating switch are disconnected, entering an AC side short-circuit fault clearing phase; and turning on the third IGBT in the unipolar full bridge submodule, and removing a driving signal of a thyristor.

* * * * *